United States Patent [19]
Caldwell

[11] 3,767,013
[45] Oct. 23, 1973

[54] START-UP LUBRICATOR

[75] Inventor: John Warren Caldwell, Glenside, Pa.

[73] Assignee: Pennwalt Corporation, Philadelphia, Pa.

[22] Filed: Aug. 16, 1971

[21] Appl. No.: 171,899

[52] U.S. Cl................... 184/6.3, 184/6.18, 308/228
[51] Int. Cl............................................. F16n 9/02
[58] Field of Search........................... 184/6.3, 6.18; 123/196 S; 308/134.1, 228, 169

[56] References Cited
UNITED STATES PATENTS

| | | | |
|---|---|---|---|
| 2,905,510 | 9/1959 | Gardiner | 308/134.1 |
| 2,253,416 | 8/1941 | Caldwell | 308/134.1 |
| 2,093,570 | 9/1937 | Meyer | 184/6.3 |
| 3,587,780 | 6/1971 | Perriman | 184/6.3 |

Primary Examiner—Manuel A. Antonakas
Attorney—Edward A. Sager

[57] ABSTRACT

A vertical spindle machine having a lubricant pump which is driven in conjunction with the spindle has a lubricator fixedly connected to the spindle for providing the spindle bearings with an initial charge of lubricant upon start-up. This initial charge satisfies the lubricant needs of the bearings until the pump reaches full operating speed, and is delivering a continuous supply of lubricant to the bearings. During rotation of the spindle, the pump delivers the lubricant to the lubricator where a predetermined charge is retained, within a first chamber while the excess flows onto the bearings; upon stopping the spindle rotation, this charge flows from the first chamber into a second chamber of the lubricator where it is available for discharge upon start-up once again.

20 Claims, 18 Drawing Figures

INVENTOR.
John W. Caldwell
BY
ATTORNEY.

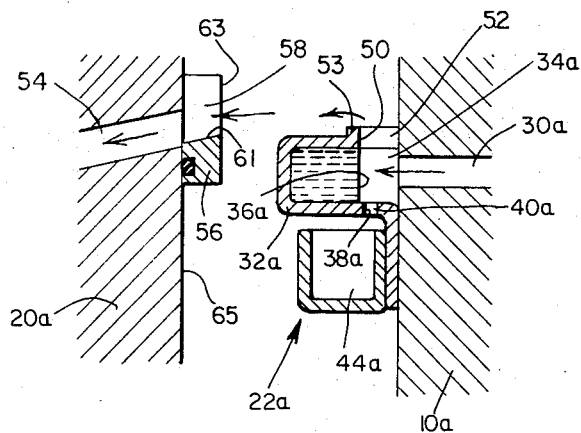
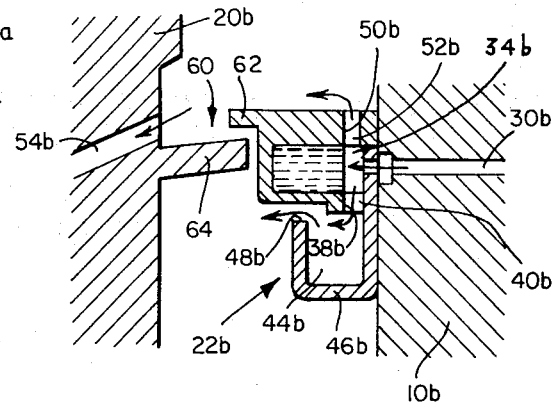
Fig. 5  Fig. 6
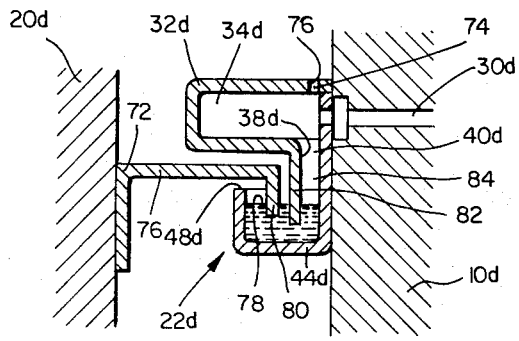
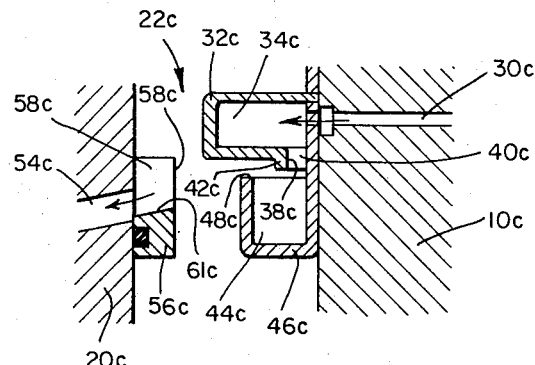
Fig. 8  Fig. 7
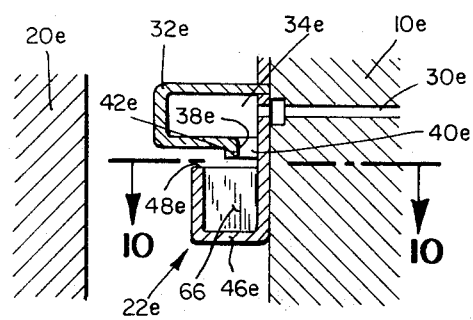
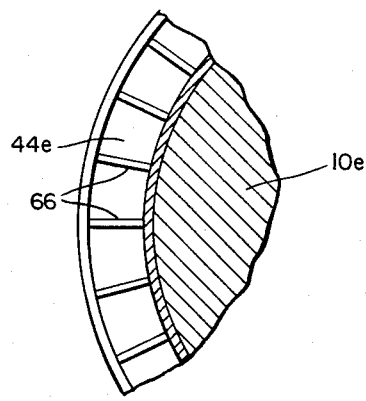
Fig. 9  Fig. 10
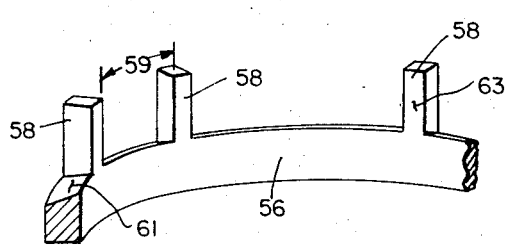
Fig. 11

START-UP LUBRICATOR

BACKGROUND OF THE INVENTION

This invention relates in general to a start-up lubricator for use with vertical spindle machinery to insure that the spindle bearings, or other parts of the machinery receive an adequate supply of lubrication during start-up of the machinery.

Lubricating the bearings of vertical spindle machinery during start-up is usually a problem where the bearing size, speed, and load dictate oil as opposed to grease lubrication. If the pump for supplying the lubricant (oil) is operatively connected with the vertical spindle of the machine, considerable time and spindle revolutions occur before lubricant reaches the bearings. For example, the lubricant pump may be directly connected to the vertical spindle, and the spindle driven by a motor, or the pump maybe driven from the motor which drives the vertical spindle. In any event, the pump is operatively connected to the vertical spindle which means that one is driven in conjunction with the other. An example of vertical spindle machinery is illustrated in U.S. Pat. No. 3,529,767 which is directed to an improved "disc-type" centrifuge.

One means which is utilized to insure that an adequate supply of lubrication reaches the bearings upon initiating rotation of a vertical spindle is to incorporate a separate motor driven pump which is driven independently of the vertical shaft, this pump being shut off after start-up since a spindle connected pump can then adequately provide for the lubrication needs of the bearings. Other means utilized for delivering lubricant to spindle bearings are shown in U.S. Pat. Nos. 1,479,304; 2,017,360; 2,067,123; 2,212,223; and 2,253,416. Many of the devices or means utilized in the prior art which attempt to supply lubricant to bearings upon start-up of vertical spindle machinery depend upon a sufficient quantity of lubricant from higher surfaces draining into a start-up reservoir after the spindle has stopped rotating. Other means are provided which submerse the bearings in lubricant; however, this requires that the parts needed to surround the bearings be of a rather large size which is a distinct disadvantage in a crowded location when there may not be sufficient space to accommodate such a construction. In a situation where there is a lack of space, it may be desirable to provide a lubricator below the bearings to be lubricated, the lubricator containing an adequate supply of lubrication to provide for the lubrication need of these bearings upon initiating rotation of the spindle.

Thus, it can be seen that a start-up lubricator is required which will deliver a pre-determined volume (charge) of lubricant to the bearings upon initiating rotation of the vertical spindle until such time that the lubricant pump is able to supply the bearings with adequate lubrication.

SUMMARY OF THE INVENTION

The present invention relates to a start-up lubricator into which lubricant is pumped by a lubricant pump during rotation of the vertical spindle, the start-up lubricator capturing and retaining a pre-determined volume or charge of lubricant while releasing the remainder to the bearings during rotation of the spindle. Upon terminating rotation of the vertical spindle, the charge of lubricant which has been retained is discharged into and retained or captured by a generally U-shaped channel or chamber, the U-shaped channel then discharging this charge of lubricant onto the bearings upon initiating rotation of the vertical spindle once more. Thus, there is always a definite or predetermined volume of lubricant ready to drain into this lower channel upon stopping the vertical spindle machine, therefore insuring that an adequate charge of lubricant is available to supply the lubricant needs of the bearings upon start-up until the lubricant pump is able to supply lubricant. While the drawings illustrate the start-up lubricator being used to lubricate bearings, it is contemplated that the lubricator may be used to lubricant other machine parts upon start-up.

The present invention allows for placement of the start-up lubricator either above or below the bearing as may be needed. Thus, upon start-up, a charge of lubricant may be released from a point below the bearings or from a point above the bearings as required.

BRIEF DESCRIPTION OF THE DRAWINGS

FIG. 5 illustrates a modification of the lubricator in which lubricant is released over the top of the lubricator to a diverting opening, with a distributor being located between the diverting opening and the lubricator to distribute a predetermined portion of the released lubricant to the diverting opening.

FIG. 6 illustrates a modification in which lubricant is released over the top of the lubricator, over shelf means, and through a diverting opening, while lubricant is simultaneously released through a bottom opening communicating with the upper chamber.

FIG. 7 illustrates a modification of the lubricator in which lubricant is released from a bottom opening of the upper chamber, a portion of the lubricant passing through a diverting opening, and the remainder thereof flowing over the bearings below.

FIG. 8 illustrates a modification in which a vapor seal is provided to prevent vapor from above the lubricator from reaching that space below the lubricator.

FIG. 9 illustrates a lubricator as shown in FIGS. 1 through 4 with a plurality of generally radially extending vanes arranged in the lower channel.

FIG. 10 is a cross-sectional view through line 10—10 of FIg. 9 illustrating the vanes within the lower channel.

FIG. 11 is a perspective view of the distributor shown in FIGS. 5 and 7.

DESCRIPTION OF THE INVENTION

Figure 1:
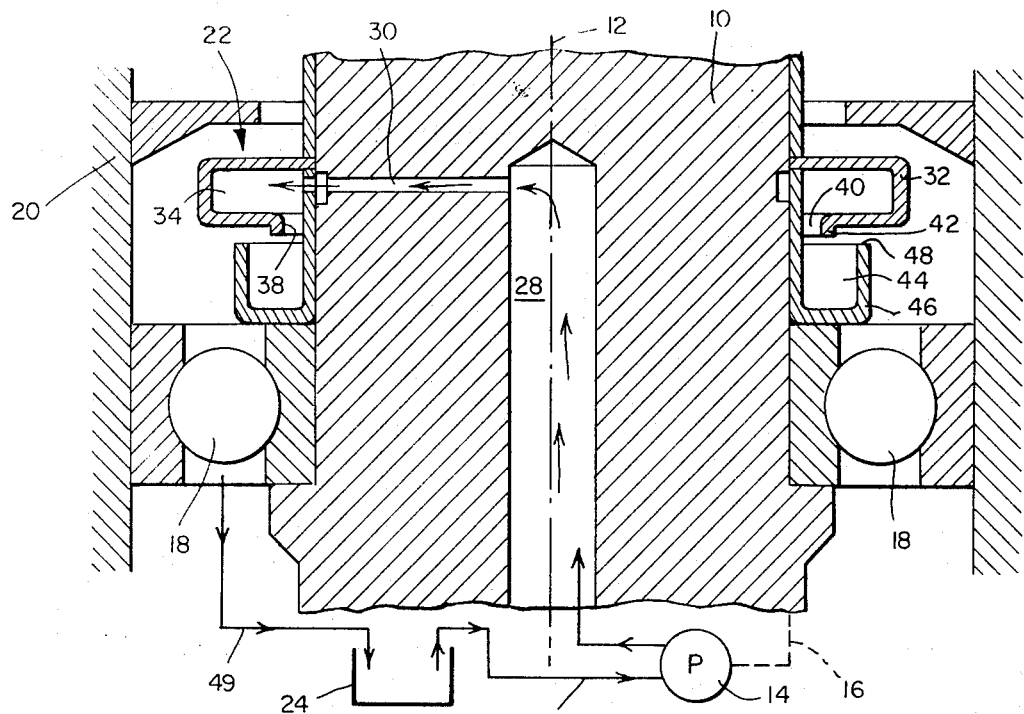
FIG. 1 is a cross-sectional view showing the start-up lubricator mounted to a vertical spindle, and showing a lubricant pump operatively connected to the spindle for delivering lubricant to the lubricator.

Referring to FIG. 1, there is shown a cross-sectional view of a portion of a vertical spindle machine incorporating the present invention. A spindle or rotor 10 mounted for rotation about a vertical or a substantially vertical axis 12 has a lubricant pump 14 operatively connected thereto as indicated at 16. As will be apparent, each of the modifications disclosed herein will operate even though the axis of rotation is not perfectly vertical; however, if this is the case, a portion of the charge which is to be retained in the lower discharge chamber may be lost. The pump is operatively connected to the spindle so as to operate in conjunction therewith; thus, the pump may be directly connected to spindle 10 as illustrated diagrammatically by the dotted line 16, or a common drive motor may be utilized to drive both the pump and the spindle.

As stated above, one of the problems with previous arrangements where a lubricant pump is driven in conjunction with a vertical spindle has been to insure that an adequate supply of lubrication reaches the bearings upon the initial start-up or rotation of spindle 10. Since pump 14 is operatively connected with spindle 10 so as to be driven in conjunction therewith, considerable time and spindle revolutions are necessary before the lubricant pump reaches a speed sufficient to deliver lubricant to bearings 18 mounted between frame member 20 and spindle 10. It should be noted that while in the present example member 20 is stationarily mounted, it may also be mounted for rotation relative to rotor or spindle 10 in some instances.

In the present invention, a start-up lubricator 22 is fixedly connected to spindle 10 so as to rotate therewith, During rotation of spindle 10, lubricant pump 14 delivers lubricant from a supply sump 24, through line 26, and into passageway 28 formed within spindle 10. From passageway 28, the lubricant passes through a radially extending passageway 30, and into the start-up lubricator 22. As can be seen, lubricator 22 is comprised of an annular wall 32 which forms an annular receiving chamber 34 which initially receives lubricant being supplied by pump 14 during rotation of the spindle 10. As spindle 10 rotates, lubricant is directed outwardly by the centrifugal force (see FIG. 2); lubricant accumulates within chamber 34 until the surface 36 of the lubricant reaches the outermost edge 38 of bottom opening 40 formed in the bottom of annular wall 32. It is noted that annular wall 32 is usually, but not necessarily, formed so as to have a downwardly extending annular overflow lip 42, the bottom surface of which may be located above, at, or below the top of an annular channel or generally U-shaped discharge chamber 44 formed by annular wall 46.

Figure 2:
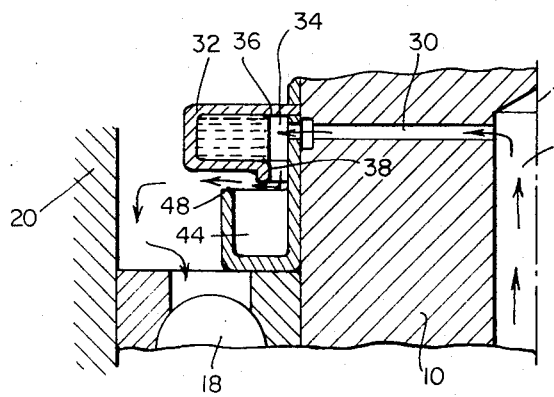
FIG. 2 illustrates the lubricator during rotation of the spindle, and illustrates the lubricant being delivered into an upper chamber, and being released from a lower opening and over an overflow lip.
Figure 3:
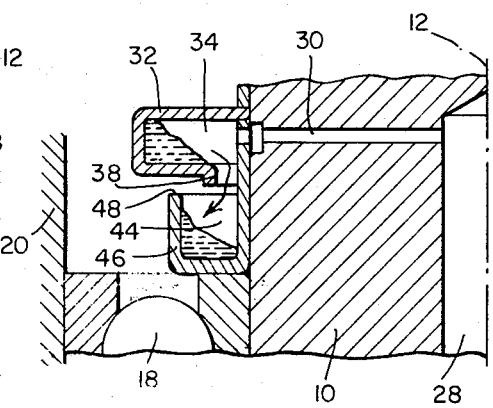
FIG. 3 illustrates the lubricator during termination of rotation of the spindle, showing a charge of lubricant being discharged into the lower generally U-shaped chamber of the lubricator.

Thus, as can be seen in FIG. 2, when lubricant level 36, reaches the outer edge 38, the excess lubricant will be released through opening 40, and discharged radially outwardly over the edge of overflow lip 42. One of the primary objects of the present invention is to insure that a fixed supply or volume (charge) of lubricant is available for start-up conditions. Thus, the volume of the charge of liquid is all or a portion of that volume of lubricant contained radially outwardly of the outer edge 38 of the bottom opening depending upon the overall design of the lubricator (see FIG. 2). As vertical spindle 10 begins to slow down during the termination of rotation thereof, the charge of lubricant contained within receiving chamber 34 begins to flow or descend into the discharge chamber 44 (see FIG. 3); by the time the spindle has completely stopped, the charge of lubricant will be received and retained within the lower discharge chamber 44.

Figure 4:
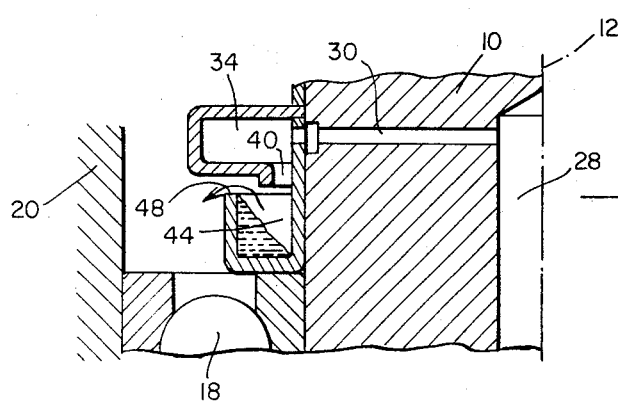
FIG. 4 is a view showing the lubricator upon start-up or initiation of rotation of the vertical spindle, and the charge of lubricant being released onto the bearings.

With the initiation of rotation of spindle 10 once again, the charge of lubricant contained within the discharge chamber 44 will be discharged radially outwardly over the upper edge 48 of the annular wall 46, and over the bearings 18 (see FIG. 4). The lubricant then flows downwardly between spindle 10 and member 20, and through line 49 (see FIG. 1) back to the supply sump 24.

Referring to FIGS. 5, 6 and 7, modifications are illustrated which allow at least a portion of the lubricant being released from lubricator 22 to be diverted via a diverting opening to a location (other than the bearings) in which it may be desirable to have lubricant supplied during the operation of the machine. It may be desirable to supply lubricant to two different locations, one of which will be the bearings as illustrated in FIGS. 1 through 4. The same reference numerals will be used throughout this specification to designate similar parts with appropriate suffixes, a, b, etc. Referring in particular to FIG. 5, a modification is shown in which the lubricant is supplied to receiving chamber 34a; once again a change of lubricant will build up within the receiving chamber until surface 36a of the lubricant reaches the outer edge 50 of top opening 52 in the annular wall 32a. It is noted, in this modification, that the outer edge 38a of bottom opening 40a is located radially inwardly from the outer edge 50 of top opening 52. Thus, when surface 36a of the lubricant reaches the outer edge 50, the excess lubricant will be released, and discharged radially outwardly over the overflow lip 53 toward diverting opening 54 formed within the member 20a.

If desired, an annular distributor 56 (see FIG. 11 also) having a plurality of upwardly extending tabs 58 may be mounted adjacent member 20a. The amount of lubricant received between adjacent tabs 58 will be proportional to distance 59 therebetween since the lubricant is distributed approximately evenly around the inside surface of member 20a. Thus, the larger the quantity of lubricant to be diverted through diverting opening 54, the larger the distance 59 between adjacent tabs located on each side of the opening; conversely if a smaller quantity is to be diverted, distance 59 is decreased. The portion of lubricant which is to flow downwardly over surface 65 and the bearings below is likewise determined by the spacing between adjacent tabs; however, in this case, there is no diverting opening between the respective adjacent tabs. Thus, the lubricant trapped between these latter tabs flow downwardly from surface 61 over the inner annular surface of distributor 56 and onto the bearings below.

Upon termination of rotation of spindle 10, the charge of lubricant contained outwardly of the outer edge 50 will descend by gravity through bottom opening 40a, and into discharge chamber 44a where it is once again available to be discharged upon initiation of rotation of the spindle 10, as described with reference to FIGS. 1 through 4. With this and with other embodiments illustrated herein, the edges of the top and bottom openings may be positioned so as to obtain whatever flow is desired through each opening depending upon the speed of the spindle.

Referring to FIG. 6, a modification is illustrated in which the outer edges 50b and 38b of the top and bottom openings respectively, are located approximately the same distance from the axis of rotation. Thus, approximately one-half of the total lubricant released from chamber 34b will flow through each of the latter mentioned openings.

Thus, in this modification lubricant received within the receiving chamber 34b will be simultaneously discharged over the edges 50b and 38b. In this instance substantially all of the lubricant being released over the edge 50b will discharged through the diverting openings 54b and none will descend onto bearings 18 supported below. This occurs because the lubricant is directed over the upper surface of shelf means 60 formed by annular extension 64 extending inwardly from member 20b; annular extension 62 extends outwardly over extension 64. Only that portion of the lubricant which is discharged outwardly over annular edge 38b will descend onto the bearings disposed below. Again, upon termination of rotation of the spindle 10b, the charge of lubricant contained within the receiving chamber 34b will descend into the lower discharge chamber 44b.

Referring to the modification illustrated in FIG. 7, a lubricator identical to the structure set forth in FIGS. 1 through 4 is illustrated. During rotation of spindle 10c, lubricant is delivered into the receiving chamber 34c until the surface of the lubricant reaches the outer edge 38c of bottom opening 40c. Upon reaching edge 38c, the excess lubricant is released radially outwardly over the overflow lip toward the diverting opening 54c. Again, a distributor 56c may be installed adjacent to member 20c to block a portion of the released lubricant from entering these openings. In the modification illustrated in FIG. 7, it can be seen that all of the lubricant released from the receiving chamber 34c is discharged out the lower opening 40c over the overflow lip 42c. Thus, as described above, depending upon the arrangement and configuration of the tabs 58c on the distributor 56c, a portion of the lqiuid will pass through diverting opening 54c, and a portion will descend over the bearings. Upon termination of the rotation of spindle 10c, the charge of lubricant contained within receiving chamber 34c will descend into the lower annular discharge chamber 44c, and be made available for lubricating the bearings below upon start-up. However, in this instance it will be noted that upon start-up, a portion of the charge of lubricant contained within discharge chamber 44c will, by using proper geometry of parts involved, be diverted through the diverting opening 54c, while the remainder will be delivered to the bearings below. This may be desirable when start-up conditions require lubricating two or more separate locations.

For preventing vapor which may be present in the space located above the lubricator from reaching the space, and consequently the bearings located below the lubricator, an arrangement such as that shown in FIG. 8 may be desirable. The lubricator is similar to that illustrated in FIGS. 1 through 4, except that a vapor sealing member 72 and usually a vent opening 74 are provided. It should be noted that the vent opening 74 is not utilized for releasing any lubricant from the receiving chamber 34d, but is provided for venting purposes. The outer edge 76 of the vent opening is usually located nearer the axis of rotation than the outer edge 38d of the lower opening 40d. A vent opening 74 is usually desirable when the pump end of the lubricant supply line feeding the lubricator is submersed in lubricant. Without a vent opening 74, upon intiating rotation of spindle 10d, the lubricant in chamber 44d might be prevented from leaving that chamber due to a suction created in the lubricant supply line when the lubricant in chamber 44d within passageway 84 moves lower. A vent could be provided on many of the variations described, but it would usually be useful only when a downward extension of chamber 32 is submerged within the fluid contained in chamber 44 while the spindle is not rotating. The vapor sealing member 72 is comprised of an annular radially extending portion 76 which extends inwardly from member 20d toward spindle 10d. Extending to a locus below the surface 78 of the charge of lubricant contained within the lower channel 44d is a downwardly extending portion 80. It should also be noted that the annular wall 32d has a downwardly extending portion 82 which defines a passageway connecting the opening 40d and the lower channel 44d. It is also noted that this portion 82 extends below the surface 78 of the charge of lubricant contained within the lower channel 44d, and that it also extends below the lower end of the portion 80. Thus, during rotation of the spindle 10d, lubricant will accumulate within the receiving chamber 34d until the surface thereof reaches the outer edge 38d of opening 40d; the lubricant is then discharged outwardly over the lower edge of downwardly extending portion 82 to the outer wall of the lower discharge chamber, over the upper edge 48d and onto the bearings below.

Where the spindle is not in an exact vertical position, or when the spindle may tilt during operation of the machinery as on board a ship, an arrangement as shown in FIGS. 9 and 10 may be desirable. Vanes 66 form a plurality of individual, non-connected compartments in chamber 44e to prevent or lessen spillage when the spindle is not rotating; smaller compartments (i.e., more vanes) means less spillage.

It is noted at this point that while no bearings are illustrated in FIGS. 5 through 9, the bearings are located in the same location as shown in FIGS. 1 through 4, i.e., below lubricator 22.

Figure 12:
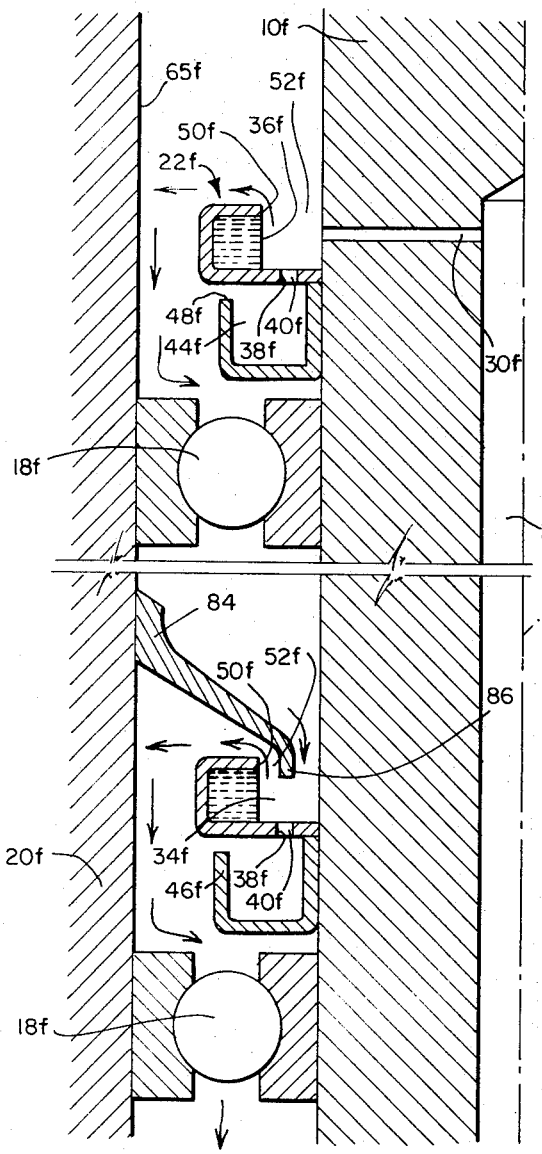
FIG. 12 illustrates an arrangement in which a plurality of lubricators are utilized such that during rotation lubricant supplied to the uppermost lubricator is directed downwardly over the bearings below and into the upper chamber of the lubricator mounted below.

When a plurality of bearings are located at various heights, and each requires lubrication upon start-up, an arrangement as shown in FIG. 12 may be desirable. This arrangement provides a start-up charge at each of the various levels at which the bearings are installed or located; thus, it is not necessary to wait for the lubricant to drain down the wall from lubricator located higher up the spindle. Because it is usually difficult to divide lubricant in the line from the pump, all lubricant is delivered to the highest or uppermost startup lubricator. Drainage down wall 65f would feed the next lower lubricator so as to fill its upper receiving chamber 34f, and be ready to drain into its discharge chamber 44f upon stopping or terminating the rotation of vertical shaft 10f; after filling the chamber 34f at speed, all remaining fluid would continue to be released over the outer edge 50f of top opening 52f. Upon terminating rotation of the spindle, the lower discharge chamber 44f of each lubricator would be charged and ready to spill or discharge a charge of lubricant upon start-up or initiation of the rotation of the spindle once more. The lower elevation lubricators would take longer to get their upper chambers refilled since their filling depends upon drainage from the above lubricators, but this is of little consequence because the lower elevation items would have received an initial charge of lubricant without having to wait for drainage from above.

Lubricant is delivered by the lubricant pump via passageways 28f, 30f into the receiving chamber 34f of the uppermost lubricator 22f, the lubricant accumulating within the receiving chamber until the surface thereof reaches the outer edge 50f of the top opening 52f, and is released outwardly, the lubricant flowing downwardly over bearings 18 located below this lubricator, and from there flowing downwardly over the annular directing member 84 into the receiving chamber 34f of the next lower lubricator. It is noted that the directing member 84 has an annular downwardly extending portion 86 which extends into the opening 52f of the lubricator. Consequently, lubricant passing over the upper bearing 18f is directed downwardly over the directing member 84 and into the receiving chamber 34f of the next lower lubricator; the lubricant accumulates therein until the surface thereof reaches the outer edge 50f of upper opening 52f, after which the lubricant is released outwardly and flows downwardly over the next lower bearing 18f. In the present modification, it is noted that the outer edge 50f of the top opening 52f is located radially outwardly from the axis of rotation such that the excess lubricant flows outwardly through the top opening 52f. Upon termination of rotation of spindle 10f, a charge of lubricant contained within each receiving chamber 34f flows through bottom opening 40f.

Figure 14:
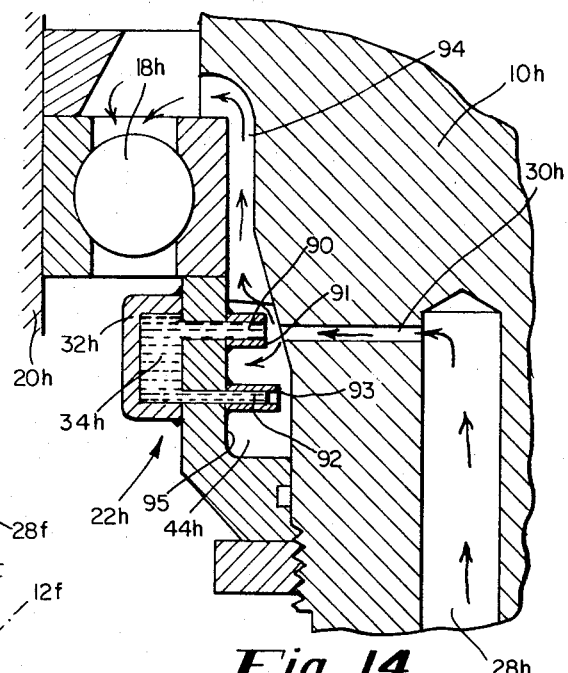
FIG. 14 illustrates an arrangement in which the lubricator is located below the bearings to be lubricated upon start-up, the lubricator being shown during rotation of the vertical spindle.
Figure 15:
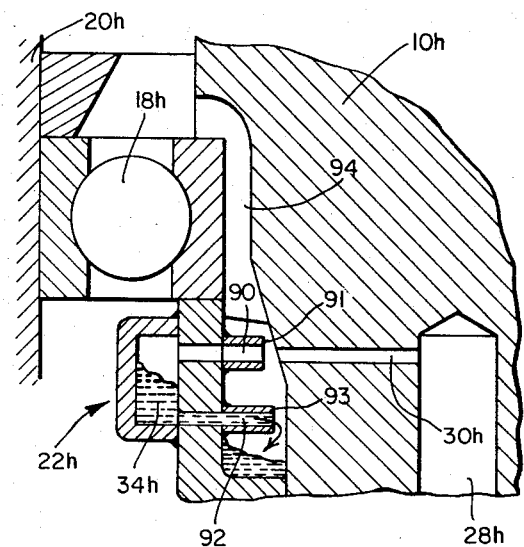
FIG. 15 is directed to the same lubricator illustrated in FIG. 14, but shows the lubricator during termination of rotation of the vertical spindle.
Figure 13:
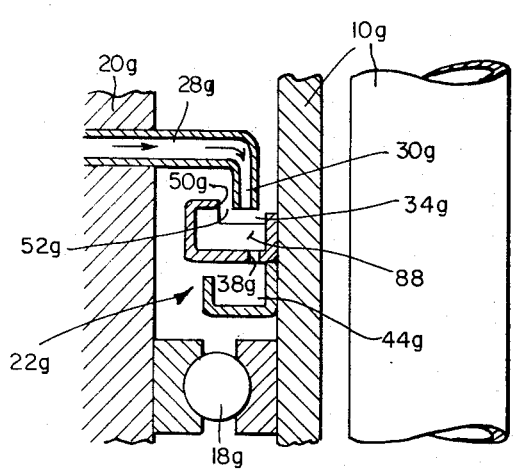
FIG. 13 illustrates an embodiment of the lubricator in which the passageway for delivering lubricant from the lubricant pump to the upper chamber of the lubricator is disposed within the stationary portion of the machine, a plurality of radially extending vanes being disposed within the upper chamber.

On applications where lubricant is supplied to the lubricator through a passageway located within the rotating spindle as shown in the previous Figures, the lubricant is accelerated to a rotational velocity near that of the rotating lubricator when it leaves the spindle and enters the receiving chamber of the lubricator. However, in certain instances, it may be desirable that the passageway extending between the lubricant pump and the lubricator be located elsewhere, i.e., somewhere other than in the rotating spindle. If the latter mentioned passageway is located within member 20g for example (FIG. 13), the lubricant will not be rotating when it enters the receiving chamber 34g of the lubricator. For this application, a plurality of generally radially extending vanes 88 are located in the receiving chamber 34g to assist in bringing the lubricant up to the rotational velocity of the lubricator 22g. Otherwise, there would be considerable slippage between the lubricant and the lubricator, with the possibility that the receiving chamber may never retain a charge of lubricant. The vanes 88 are arranged in substantially the same manner as shown in FIG. 10, except that in the present situation they are located in the receiving chamber 34g of the lubricator rather than the discharge chamber 44g; it is noted that vanes 88 need not extend completely to the bottom of chamber 34g. During rotation, lubricant will accumulate within receiving chamber 34g until the surface thereof reaches the outer edge 50g of the top opening 52g after which the lubricant is released outwardly as described previously. The lower elevation lubricators of FIG. 12 would probably use the arrangement described above, since they are being supplied by lubricant from an extension of member 20f.

Where space considerations may make it desirable or necessary to locate the lubricator below the bearings to be lubricated, an arrangement is illustrated in FIGS. 14 and 15 for accomplishing the same. Lubricant is again delivered from the pump through passageways 28h and 30h into the receiving chamber 34h of the lubricator. In the present modification, the lubricator 22h is again comprised of a receiving chamber 34h, the receiving chamber including an inwardly extending released passageway 90 and an inwardly extending discharge passageway 92, the outer ends of each of these passageways being located directly above the discharge chamber 44h. During rotation of the spindle 10h, lubricant is supplied to the receiving chamber 34h until the surface of the lubricant within this chamber reaches the end of passageway 90 after which the excess lubricant flows over the edge of this latter passageway and is directed upwardly and outwardly through delivery passageway 94 and onto the bearing 18h. Upon terminating the rotation of spindle 10h, the charge of lubricant contained within the receiving chamber 34h flows into discharge chamber 44h through the lower or discharge passageway 92 (see FIG. 15), and is available for discharge via passageway 94 upon start-up. It is necessary that passageways 90 and 92 extend inwardly from the outer surface 95 of chamber 44h in order that the lubricant charge of chamber 44h not return to chamber 34h upon initiation of rotation of spindle 10h. Passageway 30h could be placed to feed chamber 34h through passageway 92 instead of through passageway 90 as shown. Passageway 90 would then vent chamber 34h during filling and draining of that chamber.

It is noted at this point that, if desired, an annular overflow lip (similar to lip 53 in FIG. 5) may also be provided for various other overflow openings in the embodiments illustrated herein.

The geometric design of the start-up lubricator is based on the ability of the lower discharge chamber to retain lubricant flowing from the upper receiving chamber during termination of rotation of the lubricator. The diameters and depths of the chambers, and the distance between the upper and lower chambers, can be varied over a wide range depending upon the efficiency desired. However, if the receiving chamber is to be made as small as possible to substantially fill the discharge chamber upon terminating rotation then certain guidelines should be followed.

Figures 17, 18:
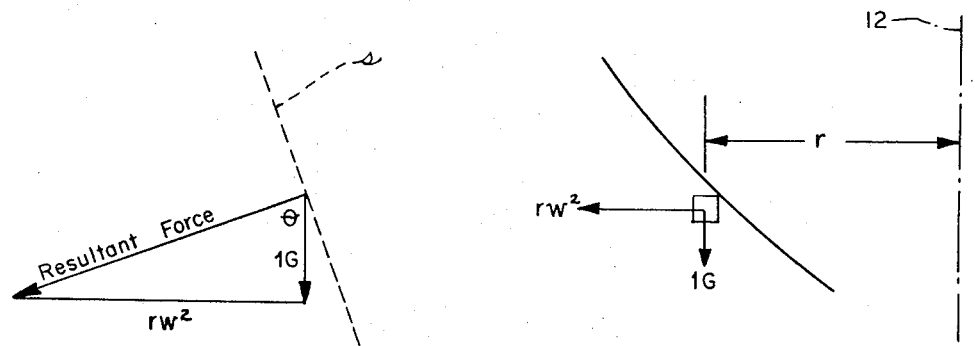
FIG. 17 illustrates the forces acting on an individual lubricant particle.
FIG. 18 illustrates the resultant force acting on an individual lubricant particle, the resultant force being perpendicular to the liquid surface of the lubricant.

The centrifugal acceleration on an individual fluid or lubricant particle (see FIGS. 16, 17 and 18) resulting from rotation is equal to $rw^2$, where:

$r$ = distance of particle from rotational axis $w$ = angular velocity $G$ = acceleration of gravity $\tan \theta = rw^2/1G$ At rest, where $rw^2 = 0$, there is still a force equal to $1G$ acting downwardly on each fluid particle so that:

$\tan \theta = 0/l = 0$ ; $\theta = 0°$

Since the liquid surface $s$ of the fluid is normal to the resultant acceleration force acting on a fluid particle, the surface is naturally horizontal. As the rotational velocity increases, $rw^2$ becomes larger and the slope of the liquid surface becomes steeper. The liquid surface $s$ actually assumes the form of a paraboloid of revolution; however, assuming that the surface $s$ is substantially a straight line, the surface $s$ can never become vertical because there is always a 1G force acting downwardly. Thus, for a given speed the liquid surface will be steeper at a larger radius than a smaller one.

Figure 16:
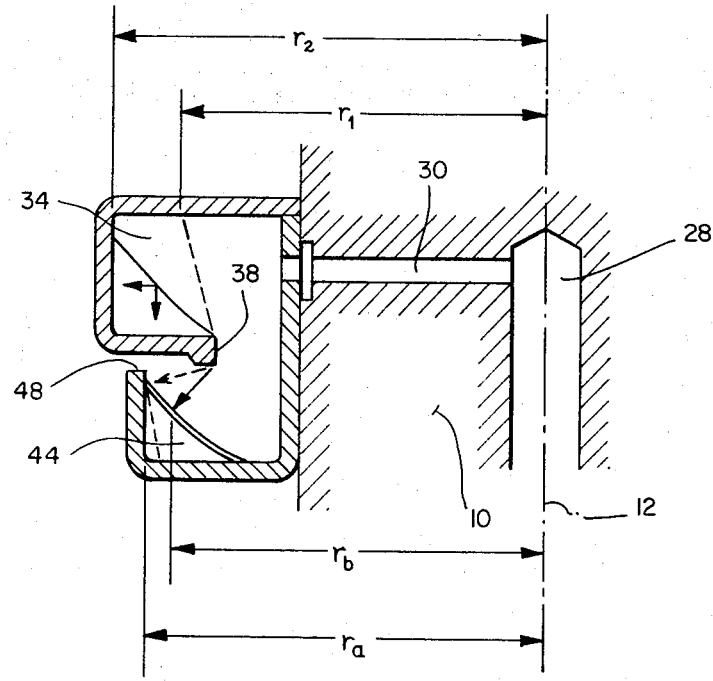
FIG. 16 illustrates the flow of the lubricant within the lubricator during termination of rotation.

When the lubricator begins to slow down, liquid starts to flow from the upper to the lower chamber. Assuming that the flow into the lubricator has stopped, the liquid surface will be at the dotted line position (FIG. 16). When the liquid spills over the lip it travels in the direction of acceleration (resultant force), which is normal to the liquid surface (the dotted line in the upper chamber), and strikes the outer wall of the lower chamber.

Since the radius $r_a$ of the point being struck by the falling liquid in the lower chamber is larger than the largest liquid radius $r_1$ of the free surface in the upper chamber, the slope of the liquid surface in the lower chamber will be steeper, and very little liquid will be retained or captured in the lower chamber. The deeper the lower chamber, the more liquid that will be retained at this stage of the operation.

At a point where the maximum liquid radius of the free surface in the upper chamber is approximately equal to the radius of the liquid in the lower chamber being struck by the draining liquid, the liquid is readily retained.

By the time the liquid has drained to the solid line position, radius $r_b$ being struck by the draining liquid is considerably less than $r_2$, so that the slope of the liquid is less than the slope at the maximum liquid radius in the upper chamber, and the liquid can be easily retained, povided chamber 44 is deep enough to prevent spill over at lip 48.

To retain nearly all of the liquid draining from the upper chamber requires that $r_a$ be less than $r_2$. If $r_a$ is equal to or greater than $r_2$, then the lower chamber must be quite deep to capture most of the draining liquid. If the lower chamber were not quite deep, then most of the liquid would be lost. Thus, the geometry of the overall design can be varied within wide limits depending upon the efficiency desired, as previously stated. An efficient design results in a full lower discharge chamber from a minimum size receiving chamber, with a minimum of lubricant lost from the discharge (lower) chamber during draining from the receiving (upper) chamber.

I claim:

1. The combination, comprising a rotor adapted to rotate about an upright axis, a lubricant pump operatively connected with said rotor and adapted to be driven in conjunction with said rotor, a start-up lubricator fixedly connected to said rotor, and means defining a lubricant passageway between said pump and said start-up lubricator for delivering lubricant from said pump to said start-up lubricator during rotation of said rotor, said start-up lubricator comprising:
   a. first means for receiving and retaining a predetermined charge of said lubricant from said pump via said lubricant passageway during rotation of said rotor, while simultaneously releasing lubricant in excess of said predetermined charge;
   b. second means for receiving and retaining said charge of lubricant from said first means during termination of said rotation, and for discharging said charge of lubricant upon initiation of said rotation.

2. The combination according to claim 1 wherein said first means defines a receiving chamber adapted to retain said charge during rotation of said rotor, said passageway extending between said pump and said receiving chamber, said first means having at least one opening therein for releasing said lubricant during rotation thereof, said second means defining a discharge chamber having at least one opening therein for receiving and discharging said charge of lubricant.

3. The combination according to claim 2 wherein said receiving and discharging chambers are annular, and surround said rotor.

4. The combination according to claim 3 wherein said first means includes a bottom opening located therein which opens into the bottom of said receiving chamber, said discharge chamber being generally U-shaped, the open end of said U-shaped discharge chamber facing upwardly and disposed under said bottom opening whereby said discharge chamber receives said charge upon initiating said rotation.

5. The combination according to claim 4 wherein said lubricant passageway is at least partially disposed within said rotor.

6. The combination according to claim 5 wherein said first means includes a downwardly extending annular overflow lip which defines the said outermost edge of said bottom opening, said lubricant being discharged radially outwardly over said overflow lip during rotation of said rotor.

7. The combination of claim 4, and further including frame means disposed adjacent said rotor, and bearing means supported between said rotor and said frame means.

8. The combination according to claim 7 wherein said frame means includes a diverting opening disposed therein for receiving at least a portion of said lubricant released from said start-up lubricator during rotation of said start-up lubricator.

9. The combination according to claim 8 wherein said first means has a top opening disposed therein, said diverting opening being disposed so as to receive at least a portion of the lubricant released through said top opening during rotation of said start-up lubricator.

10. The combination according to claim 8 and further including distributor means disposed between said start-up lubricator and said frame means for permitting only a portion of said lubricant released to pass thru said diverting opening.

11. The combination according to claim 9 and further including shelf means for directing substantially all of said lubricant released through said top opening through said diverting opening.

12. The combination according to claim 8 wherein said diverting opening is disposed so as to receive lubricant released from said bottom opening during rotation of said start-up lubricator.

13. The combination of claim 12 and further including distributor means disposed between said stationary means and said start-up lubricator for permitting only a portion of said lubricant released through said bottom opening during rotation of said start-up lubricator to pass through said diverting opening.

14. The combination according to claim 7 and further including an annular vapor sealing member, said sealing member being fixedly connected to said frame means and extending inwardly in a generally radial direction toward said rotor, and into said U-shaped discharge chamber to a locus located below the liquid level of said charge contained with said discharge chamber prior to initiating rotation of said start-up lubricator, said first means including an annular downwardly extending sealing lip which defines the outermost edge of said bottom opening, said sealing lip being disposed radially inward from said vapor sealing means and extending to a locus located below said liquid level.

15. The combination set forth in claim 4 including means defining a plurality of noncommunicating compartments within said discharge chamber.

16. The combination according to claim 7 wherein said first means includes a top opening which opens into the upper portion of said receiving chamber, and an annular directing member fixedly connected to said frame means at a locus located above said start-up lubricator.

17. The combination according to claim 2 and further including stationary means disposed adjacent said rotor, and bearing means supported between said rotor and said frame means, wherein said bearing means is located above said start-up lubricator, said first means comprising means defining release and discharge passageways extending radially inward toward said rotor, said second means defining a substantially U-shaped discharge chamber, the open end of said U-shaped discharge chamber facing in an upward direction, the ends of each of said radially extending passageways being located over the open upper end of said discharge chamber, and means defining a delivery passageway for delivering said lubricant to said bearing means, said delivery passageway extending upwardly from said discharge chamber to the upper end of said bearing means and surrounding the ends of said radially extending passageways.

18. The combination according to claim 2 wherein said lubricant passageway is at least partially disposed within said frame means, and said first means includes a plurality of generally radially extending vanes disposed within said receiving chamber to assist in bringing the lubricant up to the same rotational speed as said first means.

19. The combination according to claim 16, and including a plurality of generally radially extending vanes within said receiving chamber.

20. The combination according to claim 9, and further including distributor means disposed between said start-up lubricator and said frame means for permitting only a portion of said lubricant released through said top opening to pass through said diverting opening.

* * * * *

UNITED STATES PATENT OFFICE
CERTIFICATE OF CORRECTION

Patent No. 3,767,013                    Dated  October 23, 1973

Inventor(s) John Warren Caldwell

It is certified that error appears in the above-identified patent and that said Letters Patent are hereby corrected as shown below:

Column 1, line 49, "lubrication" should read -- lubricant --

Column 2, line 8, "lubricant" should read -- lubrication --

Column 4, line 47, "change" should read -- charge --

Column 5, line 8, "flow" should read -- flows --

Column 8, line 29, "released" should read -- release --

Column 9, line 12, " 0/1 " should read -- 0/1 --

Column 10, line 39, after "charge" and before "upon", insert -- of lubricant upon termination of said rotation, and discharges said charge --.

Signed and sealed this 19th day of March 1974.

(SEAL)
Attest:

EDWARD M. FLETCHER, JR.
Attesting Officer

C. MARSHALL DANN
Commissioner of Patents